June 14, 1938.   P. G. EDWARDS ET AL   2,120,398
CABLE STRIPPING TOOL
Filed Jan. 16, 1937   2 Sheets-Sheet 1
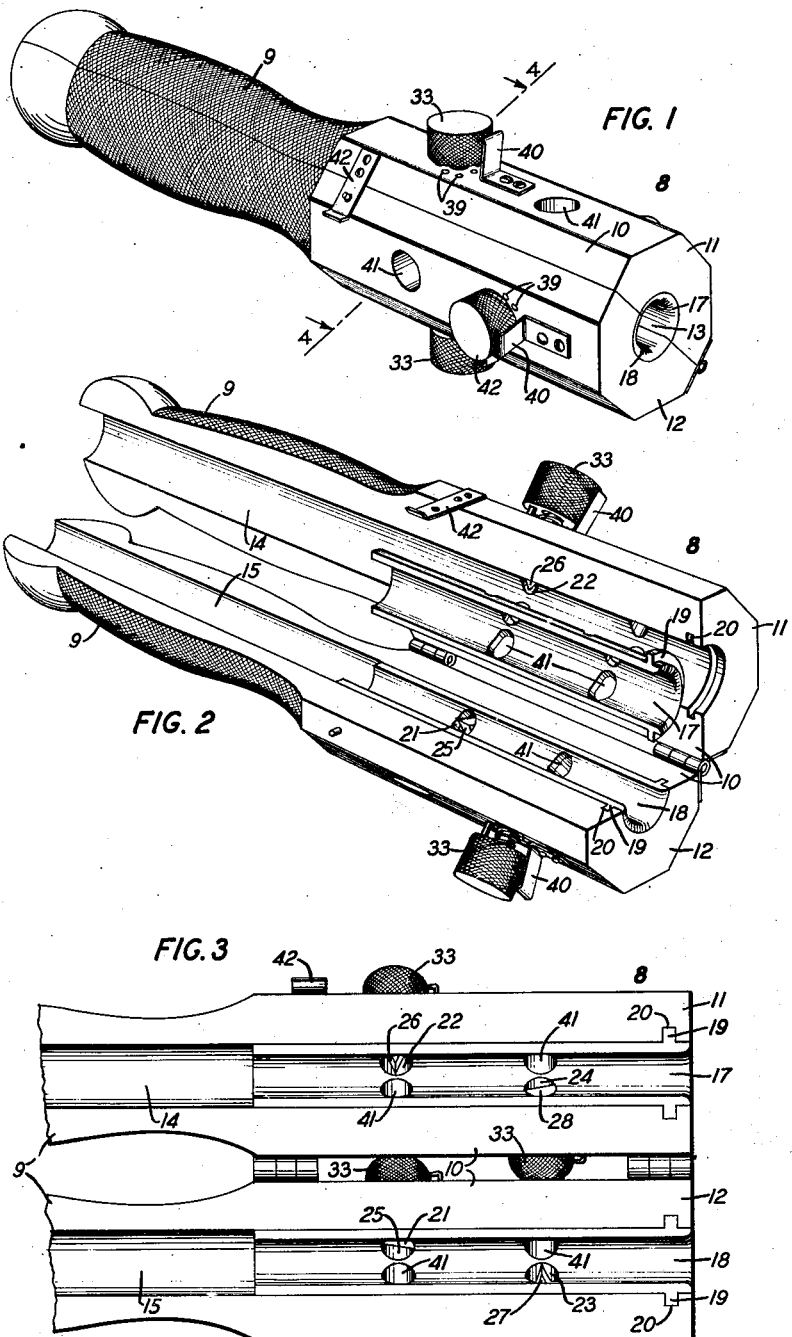
INVENTORS
P. G. EDWARDS
H. G. JORDAN
S. P. SHACKLETON
BY J. MacDonald
ATTORNEY June 14, 1938. P. G. EDWARDS ET AL 2,120,398
CABLE STRIPPING TOOL
Filed Jan. 16, 1937  2 Sheets-Sheet 2

INVENTORS
P. G. EDWARDS
H. G. JORDAN
S. P. SHACKLETON
BY J. MacDonald
ATTORNEY

Patented June 14, 1938

2,120,398

UNITED STATES PATENT OFFICE 2,120,398

CABLE STRIPPING TOOL

Paul G. Edwards, Verona, Homer G. Jordan, Fanwood, and Samuel P. Shackleton, Maplewood, N. J., assignors to Bell Telephone Laboratories, Incorporated, New York, N. Y., a corporation of New York Application January 16, 1937, Serial No. 120,902

3 Claims. (Cl. 81—9.5)

This invention relates to stripping tools and more particularly to a tool designed for stripping insulated and shielded conductors.

An object of the present invention is the provision of a tool which may be readily adjusted to strip both the insulation and shield from the cable in order to expose the conductor.

A further object of the invention is the provision of a tool which will strip only the insulation from the cable without injuring the shield or conductor.

A still further object of the invention is the provision of a single tool which will make both circumferential and longitudinal cuts in either the insulation or the shielding or in both of them.

A still further object of the invention is the provision of a tool having a plurality of stripping knives which are individually operated to cut either the insulation alone or both the insulation and the shielding.

A still further object of the invention is the provision of a tool which is readily adjustable to strip cables of various sizes and shapes.

In the installation and placement of shielded and insulated cables, it is necessary to make electrical connections both to the shield, which lies between the outer covering of insulation and the insulation surrounding the conductor and to the conductor itself. Furthermore, comparatively long lengths of insulation and/or shield must be removed usually at the end of the cable and sometimes at an intermediate point and removal of these layers by any existing methods is laborious and expensive. It is therefore desirable that a tool be provided which will not only provide means for stripping the outer insulation to expose the shield but will also provide means for stripping the shield so that the central conductor will be exposed.

This invention provides a simple, compact device which will readily strip either the insulation alone, or both the insulation and the shield.

In accordance with the general features of this invention there is provided an elongated split casing having a central bore therein. Extending from the outside of said casing and projecting into the central bore are a plurality of knives which may be operated to cut both the insulation and the shielding or the insulation alone.

In order to facilitate the removal of both the shield and the insulation, these knives are arranged to cut either circumferentially or longitudinally.

In order that various sizes and shapes of cables may be stripped, bushings are provided which may be readily inserted in the central bore to conform to the dimensions of the cable to be stripped.

A better understanding of the invention may be had by reference to the following detailed description with the accompanying drawings forming a part thereof in which:

Fig. 1 is a perspective view of the tool in its closed or normal position;

Fig. 2 is a view similar to Fig. 1 with the tool opened to receive a cable;

Fig. 3 is a fragmentary face view of the inside of the tool in its open position;

Figure 5:
Figs. 5 to 9 illustrate the various steps in the removing of the insulation and the shielding from a cable, viz.
Figure 6:
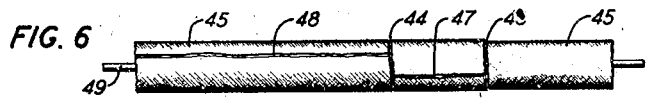
Figure 7:
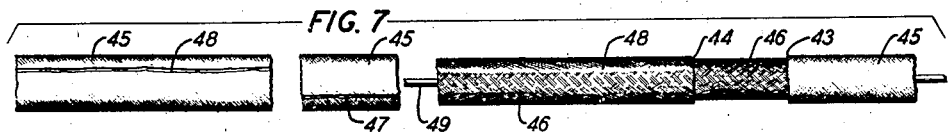
Figure 8:
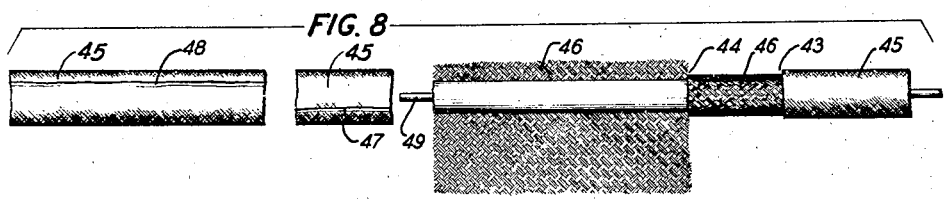
Figure 9:
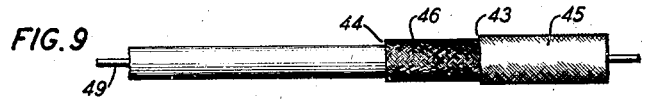

Fig. 5 shows the first step, two circumferential cuts one passing through the insulation only and the other passing through the insulation and the shielding, Fig. 6 shows the second step, a short shallow longitudinal cut between the two circumferential cuts to cut down to the shield and a long deeper cut to cut both the insulation and the metallic shield, Fig. 7 shows the insulation removed and the shield cut longitudinally, Fig. 8 is a view similar to Fig. 7 but shows the metallic shield spread open ready for removal, and Fig. 9 shows the final step with both the conductor and the shield exposed.

Referring now more particularly to the drawings, the tool 8 shown in Figs. 1, 2 and 3, illustrates one practical embodiment of our invention wherein the body or elongated portion of the tool may be constructed of any suitable material and may be either round, square, hexagonal or any other cross-sectional configuration.

The body or main portion of the tool comprises a handle portion 9 and a stripping head portion 10 and is made up of two members 11 and 12. These two members are elongated in shape and are hingedly joined together along one edge thereof to permit the two members 11 and 12 to be separated as shown in Figs. 2 and 3.

When the tool 8 is in its closed or operating position, as shown in Fig. 1, a central bore 13, which extends the entire length of the tool, is formed by the semi-circular grooves or channels 14 and 15 in the members 11 and 12. In order that the size and shape of the central bore 13 may be varied, at the stripping head 10, there are provided interchangeable bushings which may be fitted therein. While the size and shape of these bushings are limited only by the size of the bore, the applicants have shown but one type, this particular one reducing the size of the bore. This bushing extends the full length of the stripping head, is slit longitudinally and comprises the two halves 17 and 18 which are positioned in the channels 14 and 15 as shown in Figs. 2 and 3. These bushings are maintained in position by means of the shoulders 19—19 which engage the grooves 20—20 in the channels 14 and 15. These bushings are readily removable and may be replaced by various sizes and shapes as the need arises.

Figure 4:
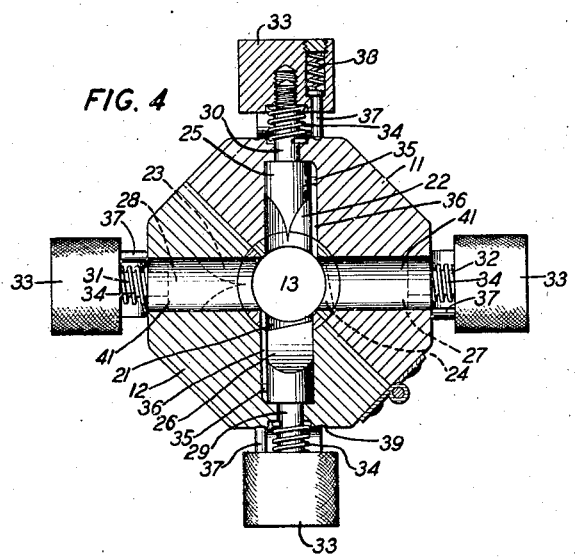
Fig. 4 is a sectional view of the tool in its closed position, as seen from the handle end taken on line 4—4 of Fig. 1.

Spaced around the stripping head 10, and located 90 degrees apart, are the transverse bores 21, 22, 23, and 24. Located in these bores and arranged in pairs are the knives 25, 26, 27, and 28. The knives 25 and 26 are diametrically opposed and are located toward the rear of the stripping head, while the knives 27 and 28 which are also diametrically opposed, are located slightly forward toward the front of the stripping head as shown in Figs. 3 and 4. The knives are substantially circular in cross-section, are slidably mounted in their respective bores and are provided at their upper ends with reduced diameter portions 29, 30, 31, and 32, thereby providing a shoulder on the knives which engages a stepped portion in the transverse bores 21, 22, 23, and 24, thereby limiting the upward movement of the knives.

Threadedly mounted on the reduced portions 29, 30, 31, and 32 are the knurled knobs or buttons 33. Located between the bottom edge of these buttons and the outer surface of the stripping head 10 are the coiled springs 34 which maintain the knives in their retracted positions with their shoulders engaging the step on the inside of the transverse bores. In order to prevent the knife blades from rotating, pins 35 are provided on the sides thereof, which engage the groove 36 in the transverse bores 21, 22, 23, and 24.

In order to adjust the amount of downward travel of the knives the distance between the casing and the underside of the knob or button is varied. This is accomplished by turning the knob 33 either clockwise or counterclockwise against the pressure of the detent which comprises a pin 37 and a spring 38. This pin engages a series of depressions 39 which are spaced around the axis of the knife. The knives are maintained in their depressed position by means of the latches 40 which engage the upper surface of the buttons 33 when they are in a depressed position.

By referring to Fig. 4 in particular, it will be observed that the knife blades are positioned in a definite relation to each other. For example the pair of knives 25 and 26 which are located toward the rear of the stripping head and which are diametrically opposite each other have their cutting blades at right-angles to each other, that is, the blade of the knife 25 is positioned to make a circumferential cut while the blade of the knife 26 is arranged to make a longitudinal cut. Similarly the knives 27 and 28 which are located slightly ahead of the knives 25 and 26 and nearer the front of the stripping head are arranged to make a longitudinal and a circumferential cut respectively. Pressing on any of the buttons or knobs 33 will cause that particular knife to enter the central bore 13 and depending upon the setting of the knob will cut into the insulation of the wire located in said bore to that particular depth and by operating the buttons in their proper sequence, various portions of insulation or shielding on a wire may be stripped. In order to observe the cut in the cable apertures 41 are provided adjacent to each knife.

By the way of illustration the applicants have shown in Figs. 5 to 9 the various steps through which a cable, having first a rubber insulation over the conductor, then a metallic shield over the rubber and then a final fabric jacket of the usual insulating material.

Assuming that we want to strip a cable in order to make a connection both to the inner conductor and to the shield, and having first adjusted the knobs on the knives to permit them to travel downwardly the proper distance to make the proper cut, the first step is to insert the wire in the central bore. This may be done either by threading it through the opening in the casing from the head end, or it may be laid in the open casing as shown in Fig. 2 and then the casing closed and locked by means of the catch 42. We are now ready to proceed with the actual stripping operation and for purpose of illustration, we will assume that the tool will be held in the left hand or in the position as shown in Figs. 1 and 2 and the cable to be stripped will be pulled through the tool by the right hand, in other words the cable will travel toward the right and the tool toward the left. The first step is to make two circumferential cuts as shown at 43 and 44 of Fig. 5. This is accomplished by pressing down the proper knives and rotating the tool, the cut 43 is made by pressing down the knife 27 which has been previously set to cut only the fabric jacket 45. After the tool has made one or more complete revolutions and has made the proper cut the catch on the button of the knife 27 is released thereby restoring the knife to its normal or retracted position and the cut 44 is similarly made. This is made by the knife 26 which is adjusted to cut both the fabric jacket 45, and the shielding 46 as shown in Figs. 7, 8, and 9. After the cut 44 has been made as shown in Fig. 5, the knife is restored to its retracted position and we are now ready to make the longitudinal cuts as shown in Figs. 6 and 7.

The knife 28 which is diametrically opposite the knife 27 has its blade longitudinally positioned and pressure on the button 33 causes the knife to engage the fabric jacket 45 and as the tool is pulled to the left and the cable to the right, the longitudinal cut 47 will be made, this knife, however, being adjusted to cut only the fabric jacket 45 will not injure the metallic shielding 46. The knife is then restored to its normal or retracted position as heretofore described. It is now necessary to strip the metallic shield. This is accomplished by rotating the cable slightly then pressing the button 33 on the knife 25 and starting at the circumferential cut 44, the tool is drawn to the left, the result being that the shield 46 and the fabric jacket 45 will be slit at 48 as shown in Figs. 6 and 7.

Four cuts have now been made, two circumferentially namely 43 and 44 and two longitudinally 47 and 48, the cuts 43 and 47 being of approximately the same depth and the cuts 44 and 48 also approximately of the same depth. As shown in Fig. 7 the fabric jacket 45 is readily removed from the cable, thereby exposing the metallic shield which is likewise slit. This shield is then removed as shown in Fig. 8 and the result as shown in Fig. 9 being a cable in which the central conductor 49 has been bared and the shield 46 exposed, thereby permitting connections to be made both to the metallic shield and to the central conductor.

The sequence of cuts as described serve only to illustrate one way of using applicants' tool and it is readily apparent that the sequence of operations may be varied to suit the necessary requirements.

What is claimed is:

1. A tool for stripping insulated and shielded cable comprising a pair of hingedly joined elongated members, said members having grooves therein forming when closed a bore for confining a cable therein, means on said members for maintaining them in a closed position, a plurality of adjustable knives transversely mounted in said members and having their upper ends projecting beyond the outer surface of said members, means on said knives for maintaining them in a retracted position, means on said knives for adjusting the amount of downward travel of said knives when pressure is applied to the top thereof, and means for maintaining said knives in a depressed position.

2. A tool for stripping insulated and shielded cable comprising a pair of hingedly joined elongated members having grooves therein and adapted when fitted together in closed relation to form a bore for the introduction of the cable, and means on said members for holding them closed, two sets of knives adjustably mounted in said members, each set of knives being arranged in pairs and in diametrically opposed relation and spaced 90 degrees apart and means on said knives for causing their blades to project into said bore when pressure is applied to the top thereof.

3. A tool for stripping insulated and shielded cables comprising a pair of hingedly joined elongated members having grooves therein and adapted, when fitted together in closed relation to form a bore for the introduction of the cable, means on said members for holding them closed, a plurality of knives adjustably mounted in said members, said knives being arranged in pairs spaced 90 degrees apart and diametrically opposed, means on said knives for causing their blades to project into said bore when pressure is applied to the top thereof, and removable bushings in said bore for varying the diameter thereof.

PAUL G. EDWARDS.
HOMER G. JORDAN.
SAMUEL P. SHACKLETON.